US011937753B2

(12) United States Patent
Sing

(10) Patent No.: US 11,937,753 B2
(45) Date of Patent: Mar. 26, 2024

(54) DOMESTIC APPLIANCE

(71) Applicant: BSH Hausgeräte GmbH, Munich (DE)

(72) Inventor: Alexander Sing, Wittislingen (DE)

(73) Assignee: BSH Hausgeräte GmbH, Munich (DE)

( * ) Notice: Subject to any disclaimer, the term of this patent is extended or adjusted under 35 U.S.C. 154(b) by 164 days.

(21) Appl. No.: 17/279,113

(22) PCT Filed: Sep. 30, 2019

(86) PCT No.: PCT/EP2019/076407

§ 371 (c)(1),
(2) Date: Mar. 24, 2021

(87) PCT Pub. No.: WO2020/074299

PCT Pub. Date: Apr. 16, 2020

(65) Prior Publication Data

US 2021/0393106 A1 Dec. 23, 2021

(30) Foreign Application Priority Data

Oct. 12, 2018 (DE) ..................... 10 2018 217 547.0

(51) Int. Cl.
*A47L 15/42* (2006.01)
*D06F 39/12* (2006.01)
(Continued)

(52) U.S. Cl.
CPC ....... *A47L 15/4209* (2016.11); *A47L 15/4291* (2013.01); *A47L 15/4246* (2013.01);
(Continued)

(58) Field of Classification Search
None
See application file for complete search history.

(56) References Cited

U.S. PATENT DOCUMENTS 5,701,999 A * 12/1997 Phillips, II et al. ... B65D 85/30 206/320
9,922,634 B2 * 3/2018 Thompson, Jr. ..... G10K 11/168

FOREIGN PATENT DOCUMENTS

DE 4110292 A1 10/1992
DE 4227957 A1 2/1994
(Continued)

OTHER PUBLICATIONS

What is Thermal Conductivity of Expanded Polystyrene—Definition (thermal-engineering.org) (May 22, 2019), Nick Conner, https://www.thermal-engineering.org/what-is-thermal-conductivity-of-expanded-polystyrene-definition/#google_vignette (Year: 2019).*
(Continued)

*Primary Examiner* — Rita P Adhlakha
(74) *Attorney, Agent, or Firm* — Michael E. Tschupp; Andre Pallapies; Brandon G. Braun

(57) ABSTRACT

A household appliance includes a functional container, an insulation arrangement provided on an outside of the functional container and configured to thermally and/or acoustically insulate the functional container. The insulation arrangement includes a single-piece first insulation element which is made of a plastic material selected such that a surface of the first insulation element in facing relation to the functional container adheres to the functional container and is separable herefrom in a non-destructive manner.

19 Claims, 12 Drawing Sheets

(51) Int. Cl.
*F25D 23/06* (2006.01)
*G10K 11/00* (2006.01)

(52) U.S. Cl.
CPC .............. *D06F 39/12* (2013.01); *F25D 23/06* (2013.01); *G10K 11/00* (2013.01)

(56) References Cited

FOREIGN PATENT DOCUMENTS

| | | | |
|---|---|---|---|
| DE | 102013214840 | A1 | 2/2015 |
| EP | 3092934 | A1 | 11/2016 |

OTHER PUBLICATIONS

Polystyrene—Material Table—Applications—Price, https://material-properties.org/polystyrene-properties-application-price/#google_vignette (Year: 2023).*
List of thermal conductivities—Wikipedia (2003-2016), https://en.wikipedia.org/wiki/List_of_thermal_conductivities (Year: 2016).*
The Power of Polyurethane (May 15, 2020), Staff Writer at BASF, https://insights.basf.com/home/article/read/the-power-of-polyurethane (Year: 2020).*
International Search Report PCT/EP2019/076407 dated Nov. 7, 2019.

* cited by examiner

DOMESTIC APPLIANCE

CROSS-REFERENCES TO RELATED APPLICATIONS

This application is the U.S. National Stage of International Application No. PCT/EP2019/076407, filed Sep. 30, 2019, which designated the United States and has been published as International Publication No. WO 2020/074299 A1 and which claims the priority of German Patent Application, Ser. No. 10 2018 217 547.0, filed Oct. 12, 2018, pursuant to 35 U.S.C. 119(a)-(d).

BACKGROUND OF THE INVENTION

The present invention relates to a household appliance, in particular a household dishwasher.

To acoustically insulate a dishwasher cavity of a household dishwasher, bitumen mats can be attached to the dishwasher cavity. The bitumen mats can be bonded to the outside of the dishwasher cavity with the aid of a hot-melt adhesive, for instance. Bitumen mats of this type have a high heat absorption capacity and conduct the absorbed heat away from the dishwasher cavity. This reduction in the occupied surface nevertheless results in an increase in the sound emission of the household dishwasher.

The publication EP 3 092 935 A1 discloses an arrangement for thermally and acoustically insulating an absorption area of a household dishwasher. The arrangement comprises a first insulation element for thermally insulating the absorption area and a second insulation element for acoustically insulating the absorption area, wherein the first insulation element is arranged between the absorption area and the second insulation element, and wherein the first insulation element is injected directly onto the absorption area. With this arrangement, additional fastening of the insulation arrangement to the dishwasher cavity, for instance with the aid of an adhesive, can be omitted. However, after the service life of the household dishwasher has ended, the insulation arrangement can only be separated again from the dishwasher cavity with increased effort, since the first insulation element is injected directly onto the absorption area.

BRIEF SUMMARY OF THE INVENTION

Against this background, an object of the present invention consists in providing an improved household appliance, in particular an improved household dishwasher.

Accordingly, a household appliance, in particular a household dishwasher, is proposed with a functional container, in particular dishwasher cavity, an insulation arrangement provided on the outside of the functional container, in particular dishwasher cavity, for thermally and/or acoustically insulating the functional container, in particular dishwasher cavity, and a fastening facility for mechanically fastening the insulation arrangement to the functional container, in particular dishwasher cavity. Here the insulation arrangement has an insulation element, wherein the insulation element is manufactured as a single piece of plastic material, which, in a cured and/or cross-linked state, preferably has adhesive properties so that the insulation element with a surface facing the functional container, in particular dishwasher cavity, adheres to the functional container, in particular dishwasher cavity, and can be separated from the same in a non-destructive manner.

On account of provision of the fastening facility, contact pressure of the insulation arrangement against the functional container, in particular dishwasher cavity, can be maintained throughout the entire service life of the household appliance, in particular the household dishwasher. In this way the fastening facility assists the preferably adhesive properties of the insulation element. Furthermore, the bond between the insulation arrangement and the functional container, in particular dishwasher cavity, is ensured throughout the entire service life of the household appliance, in particular of the household dishwasher. On account of the constant contact pressure, the thermal and/or acoustic function of the insulation arrangement is also ensured throughout the entire service life of the household appliance, in particular of the household dishwasher.

The insulation element is preferably manufactured continuously from the plastic material. "As a single piece" here means that the insulation element only has one material, namely the previously mentioned plastic material. The functional container, in particular dishwasher cavity, is in particular cuboid and comprises a base, a rear wall, a ceiling, two side walls which face one another and a door. The insulation arrangement here can be provided in each case on the rear wall, the ceiling, the side walls and/or on the door. The insulation arrangement can also further be provided on the base. The functional container, in particular dishwasher cavity and the door enclose a functional space, in particular washing compartment, of the household appliance, in particular of the household dishwasher. An item to be cleaned can be received in the functional space, in particular washing compartment. The insulation element can also be referred to as a first insulation element. The insulation element is suited to insulating the functional container, in particular dishwasher cavity, thermally and/or acoustically. The insulation element can therefore also be referred to as a thermal and/or acoustic insulation element.

"On the outside" here means facing away from the functional space, in particular washing compartment. For instance, the rear wall, the base, the ceiling, the side walls and/or the door in each case have an interior facing the functional space, in particular washing compartment, and an exterior facing away from the functional space, in particular washing compartment. The insulation arrangement is provided on the respective exterior. The fact that the insulation element can be separated from the functional container, in particular dishwasher cavity, "in a non-destructive manner" means that the insulation element can be withdrawn or removed from the functional container, in particular dishwasher cavity, without residues from the insulation element remaining on the functional container, in particular dishwasher cavity. However, small residues may also remain on the functional container, in particular dishwasher cavity. In other words, the insulation element can be easily removed from the functional container, in particular dishwasher cavity, but residues may however remain on the functional container, in particular dishwasher cavity. These can be removed by rubbing. In particular, the insulation element can be separated from the functional container, in particular dishwasher cavity, without auxiliary means, such as solvents, for instance. The bond between the insulation element and the functional container, in particular dishwasher cavity, can be a low-adhesion adhesive bond. "Mechanical fastening" is to be understood here to mean in particular that the fastening facility fixes the insulation arrangement to the functional container, in particular dishwasher cavity, in a form-fit and/or frictional manner. To this end the fastening facility can be connected with the functional container, in particular dishwasher cavity, in a form-fit manner, for instance.

The plastic material can have a number of components, which are mixed in order to produce the insulation element and react chemically to one another so that the plastic material is completely cured and/or cross-linked. The plastic material itself has the preferably adhesive or preferably sticky properties. "Adhesion" is to be understood here to mean the property of the plastic material, that the surface of the insulation element facing the dishwasher cavity interacts with an exterior of the functional container, in particular dishwasher cavity, so that the insulation element adheres to the functional container, in particular dishwasher cavity. The adhesion can be based here on molecular interactions between the plastic material and the material of the functional container, in particular dishwasher cavity. Furthermore, the adhesion can also be based on physical-mechanical forces. For instance, the plastic material can interlock with or hook into microscopically small pores and/or depressions in the functional container, in particular dishwasher cavity. In particular, the insulation element is connected to the functional container, in particular dishwasher cavity, without an adhesive. As previously mentioned, the plastic material of the insulation element itself comprises preferably adhesive or preferably sticky properties. In this way it is possible to dispense with an adhesive for connecting the insulation element to the functional container, in particular dishwasher cavity. This simplifies the manufacture of the household appliance, in particular the household dishwasher, and enables an improved recovery of the materials used.

According to an embodiment the plastic material is a polyurethane, in particular an expanded polyurethane.

The polyurethane preferably has an open pore structure. The plastic material is therefore compressible, so that during compression air can escape from the plastic material. Other suitable plastic materials can also be used.

According to a further embodiment, the plastic material has viscoelastic properties.

"Viscoelasticity" refers to a partially elastic, partially viscous material behavior. Viscoelastic materials therefore combine features of solid bodies and liquids.

According to a further embodiment, the fastening facility is connected to the functional container, in particular dishwasher cavity.

The fastening facility is preferably connected to the functional container, in particular dishwasher cavity, in a form-fit manner. For instance, the fastening facility can be screwed or clamped to the functional container, in particular dishwasher cavity. In the event that the fastening facility fastens the insulation arrangement to a side wall of the functional container, in particular dishwasher cavity, the fastening facility can be connected to the ceiling and the base of the functional container, in particular dishwasher cavity, for instance, and thus press the insulation arrangement against the side wall.

According to a further embodiment, the insulation arrangement has a first insulation element, which is manufactured from the plastic material, and a second insulation element, wherein the first insulation element is arranged between the functional container, in particular dishwasher cavity, and the second insulation element.

The second insulation element is optional. The second insulation element can be used to acoustically insulate the functional container, in particular dishwasher cavity. The second insulation element can be referred to as an acoustic insulation element. As a result of the first insulation element being arranged between the functional container, in particular dishwasher cavity, and the second insulation element, the second insulation element is not able to take heat from the dishwasher cavity. This improves the energy efficiency of the household appliance, in particular of the household dishwasher. The second insulation element is used in particular as a mass layer. The second insulation element improves the acoustic properties of the insulation arrangement.

According to a further embodiment, the fastening facility is an external cladding provided on the outside of the functional container, in particular dishwasher cavity, wherein the second insulation element is arranged between the fastening facility and the first insulation element.

The external cladding can be part of a housing of the household appliance, in particular of the household dishwasher. The external cladding can therefore fulfill a dual function, namely operate as part of the housing of the household appliance, in particular of the household dishwasher, and simultaneously mechanically fasten the insulation elements to the functional container, in particular dishwasher cavity.

According to a further embodiment, the fastening facility is a grid or mesh provided on the outside of the functional container, in particular dishwasher cavity, wherein the second insulation element is arranged between the fastening facility and the first insulation element.

The use of meshes and grids made from plastics or metal enables a large-area fixing of the insulation arrangement to the functional container, in particular dishwasher cavity, with a low material outlay.

According to a further embodiment, the second insulation element has a reinforcement, in particular in the form of ribs or beading.

The reinforcement is then preferably provided if the insulation arrangement is provided on the rear wall of the functional container, in particular dishwasher cavity. The reinforcement can be integrated into the outer lying second insulation element. If, in addition to the planar geometry of the second insulation element, a reinforcement in the form of ribs or a beading is provided, the entire insulation arrangement can advantageously be fastened to the functional container, in particular dishwasher cavity. The reinforcement can be an additional, outer lying component. The second insulation element can also be designed in such a way that it offers adequate rigidity in terms of geometry and/or material properties, in order to be pressed against the rear wall of the functional container, in particular dishwasher cavity, across the entire width of the rear wall. Furthermore, the reinforcement in the second insulation element can also be molded inwards in the direction of the functional container, in particular dishwasher cavity. On account of such a design of the reinforcement, the insulation arrangement can be fastened to the rear wall, if a clip or fastening of the fastening facility is only provided on the edge of the rear wall. The reinforcement acts in a supporting manner across the width of the insulation arrangement and transfers the retaining forces into the insulation arrangement.

According to a further embodiment, the reinforcement projects away from the functional container, in particular dishwasher cavity, out of the second insulation element or the reinforcement projects toward the functional container, in particular dishwasher cavity, into the second insulation element.

An increase in the bending stiffness of the insulation arrangement can be achieved for the rear wall with the aid of the reinforcement. The pretensioning of the fastening facility on the functional container, in particular dishwasher cavity, and the fastening of the same to the edge of the functional container, in particular dishwasher cavity, results in a more secure, more permanent and large-area fixing of the insulation arrangement to the rear wall. An acoustically favorable connection of the rear wall to the first insulation element can be achieved. A permanent and secure connection of the insulation arrangement to the rear wall is reached. In the case that the reinforcement projects into the second insulation element, a particularly space-saving arrangement can be achieved. If the reinforcement is introduced into the insulation element itself, a particularly cost-effective reinforcement can be achieved.

According to a further embodiment, the fastening facility is spring pretensioned so that the fastening facility presses the insulation arrangement against the functional container, in particular dishwasher cavity.

In particular, a predefined contact pressure can be achieved with the aid of the fastening facility. On account of the constant contact pressure, a thermal and/or acoustic function of the insulation arrangement is also ensured throughout the entire service life of the household appliance, in particular the household dishwasher.

Further possible implementations of the invention also comprise not explicitly cited combinations of features or embodiments described previously or below with respect to the exemplary embodiments. In this context, the person skilled in the art will also add individual aspects as improvements or enhancements to the respective basic form of the invention.

BRIEF DESCRIPTION OF THE DRAWINGS

Further advantageous embodiments and aspects of the invention form the subject matter of the subclaims and of the exemplary embodiments of the invention that are described below. The invention is described below in greater detail on the basis of preferred embodiments with reference to the attached figures, in which:

DETAILED DESCRIPTION OF EXEMPLARY EMBODIMENTS OF THE PRESENT INVENTION

Figure 1:
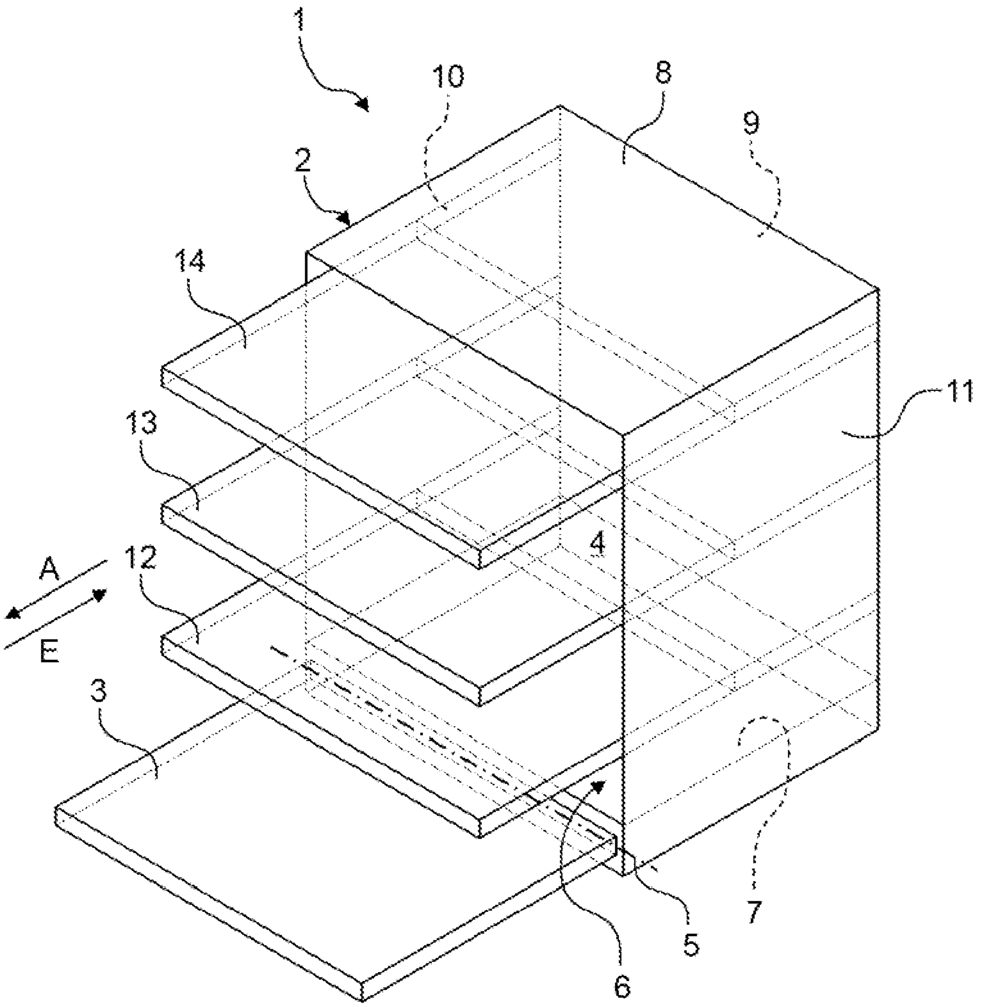
FIG. 1 shows a schematic perspective view of an embodiment of a household appliance in the embodiment of a household dishwasher.

In the figures, elements that are identical or have the same function are provided with the same reference characters unless specified otherwise.

FIG. 1 shows a schematic perspective view of an embodiment of a household appliance in the embodiment of a household dishwasher 1. The household dishwasher 1 comprises a functional container in the form of a dishwasher cavity 2, which can be closed, in particular in a watertight manner, by a door 3. To this end, a sealing facility may be provided between the door 3 and the dishwasher cavity 2. The dishwasher cavity 2 is preferably cuboid. The dishwasher cavity 2 can be arranged in a housing of the household dishwasher 1. The dishwasher cavity 2 and the door 3 can form a washing compartment 4 for washing items to be washed.

The door 3 is shown in its opened position in FIG. 1. The door 3 can be closed or opened by pivoting about a pivot axis 5 provided on a lower end of the door 3. A loading opening 6 of the dishwasher cavity 2 can be closed or opened with the aid of the door 3. The dishwasher cavity 2 has a base 7, a ceiling 8 arranged opposite the base 7, a rear wall 9 arranged opposite the closed door 3 and two side walls 10, 11 arranged opposite one another. The base 7, the ceiling 8, the rear wall 9 and the side walls 10, 11 may be manufactured from a stainless-steel sheet, for example. Alternatively, the base 7 may be manufactured from a plastic material, for example.

The household dishwasher 1 also has at least one receptacle 12 to 14 for items to be washed. A number of, for instance three, receptacles 12 to 14 for items to be washed can preferably be provided, wherein the receptacle 12 for items to be washed can be a lower receptacle for items to be washed or a base basket, the receptacle 13 for items to be washed can be an upper receptacle for items to be washed or an upper basket and the receptacle 14 for items to be washed can be a cutlery drawer. As additionally shown in FIG. 1, the receptacles 12 to 14 for items to be washed are arranged one above the another in the dishwasher cavity 2. Each receptacle 12 to 14 for items to be washed is optionally able to be shifted into or out of the dishwasher cavity 2. In particular, each receptacle 12 to 14 for items to be washed can be inserted or moved into the dishwasher cavity 2 in an insertion direction E (arrow) and extracted or moved out from the dishwasher cavity 2 against the insertion direction E (arrow) in an extraction direction A (arrow).

The inventive household appliance 1 can generally be a household dishwasher, a household washing machine or a household tumble dryer. Depending on the household appliance type, the functional container can be a dishwasher cavity, an outer tub or a laundry drum. A household washing machine of this type is known, for instance, from the publication EP 2 049 723 A1, whereas a household tumble dryer of this type is by contrast known from the publication DE 33 45 303 A1. The content of these publications cited by way of example in this regard is herewith made as the subject matter of the present description.

Figure 2A:
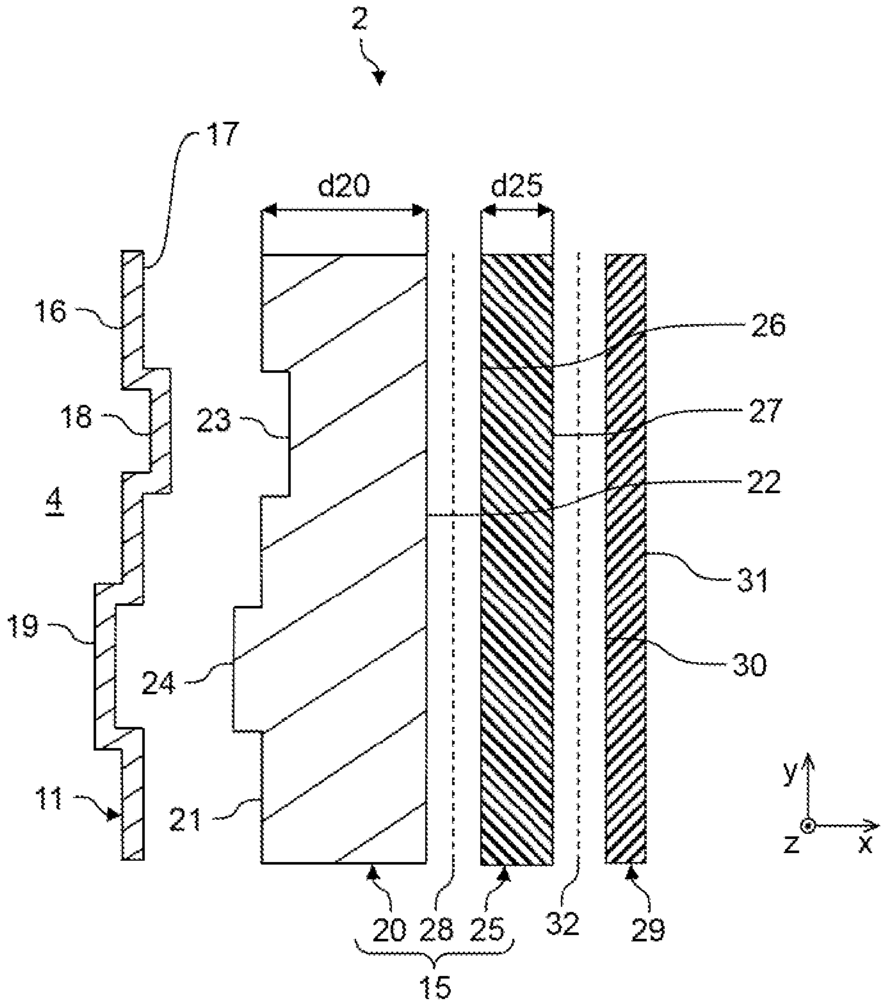
FIG. 2A shows a schematic partial sectional view of an embodiment of a dishwasher cavity for the household dishwasher according to FIG. 1 in an exploded representation.
Figure 3A:
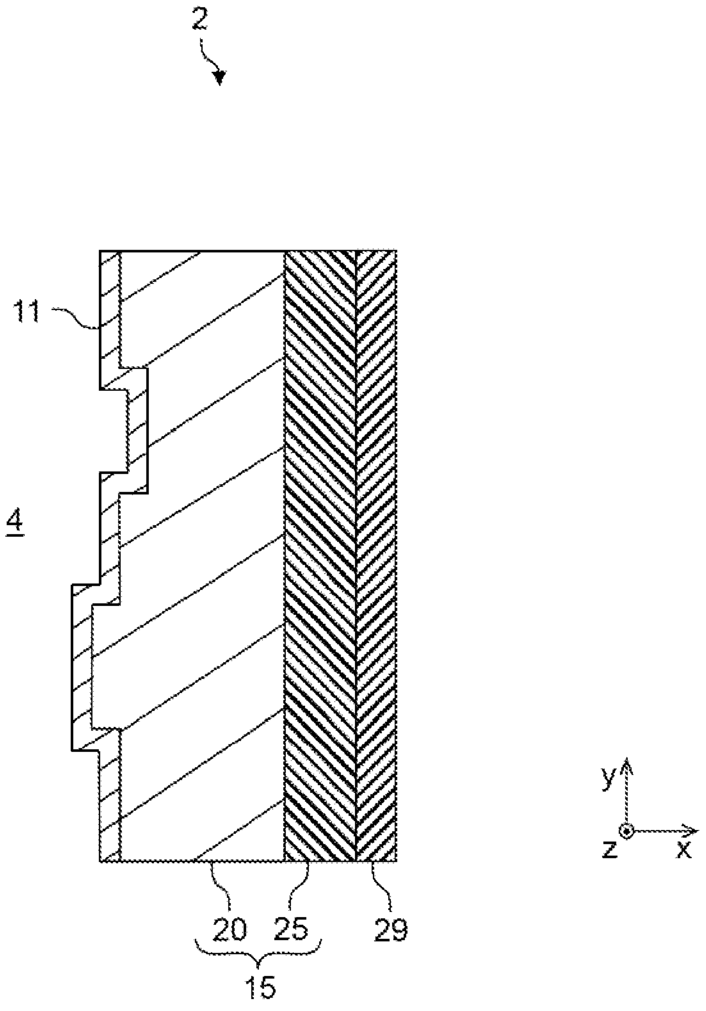
FIG. 3A shows a further schematic partial sectional view of the dishwasher cavity according to FIG. 2A.

FIG. 2A shows a schematic partial sectional view of an embodiment of the dishwasher cavity 2 in an exploded representation. FIG. 3A shows a further partial sectional view of the dishwasher cavity 2. In particular, only the side wall 11 of the dishwasher cavity is shown in FIGS. 2A and 3A. The household dishwasher 1 comprises an insulation arrangement 15 for thermally and/or acoustically insulating the dishwasher cavity 2. The insulation arrangement 15 can be provided on the two side walls 10, 11 of the ceiling 8, rear wall 9 and/or the door 3. The insulation arrangement 15 can also be provided on the base 7. This means that the dishwasher cavity 2 can be received in the insulation arrangement 15 and enclose or include this at least in sections. The insulation arrangement 15 is provided on the outside of the dishwasher cavity 2. "On the outside" here means facing away from the washing compartment 4.

The side wall 1 comprises in particular an interior 16, which faces the washing compartment 4, and an exterior 17, which faces away from the washing compartment 4. The insulation arrangement 15 is provided on the exterior 17. The side wall 11 or the dishwasher cavity 2 can have an elevation 18 on the outside. The elevation 18 projects out of the exterior 17 away from the washing compartment 4. The elevation 18 can be a beading or embossing impressed into the dishwasher cavity 2. Any number of elevations 18 can be provided.

The side wall can also have a depression 19 which extends in the direction of the washing compartment 4. The depression 19 extends out of the interior 16 into the washing compartment 4. The depression 19 can, like the elevation 18, be a beading or embossing impressed into the dishwasher cavity 2. For instance, the elevation 18 and the depression 19 can be suited to reinforcing the side wall 11. Any number of depressions 19 can be provided. The elevation 18 and the depression 19 are optional. The elevation 18 and the depression 19 can run along a z-direction or depth direction z (arrow) and/or along a y-direction or height direction y (arrow) of the dishwasher cavity 2. An x-direction or width direction x (arrow) of the dishwasher cavity 2 is shown in FIGS. 2A and 3A. The directions x, y, z form a coordinate system of the dishwasher cavity 2.

The insulation arrangement 15 comprises a first insulation element 20. The first insulation element 20 is suited to insulating the dishwasher cavity 2 thermally and/or acoustically. The first insulation element 20 can also be referred to as a thermal and/or acoustic insulation element. The first insulation element has a first surface 21, which faces the exterior 17 of the side wall 11. Furthermore, the first insulation element 20 comprises a second surface 22 facing away from the first surface 21. An optional depression 23 which corresponds to the elevation 18 of the side wall 11 is provided on the first surface 21. Here the elevation 18 can engage into the depression 23 in a form-fit manner. A form-fit connection is produced as a result of the meshing or rearward engagement of at least two connection partners, in this case the elevation 18 and the depression 23. Any number of depressions 23 can be provided.

Furthermore, an optional elevation 24 which corresponds to the depression 19 of the side wall 11 is provided on the first surface 21. The elevation 24 can engage into the depression 19 in a form-fit manner. The first insulation element 20 can therefore be connected to the dishwasher cavity 2 in a form-fit manner. The form-fit connection is afflicted with play here. In this context "afflicted with play" means that a depth of the depression 23, viewed in the width direction x (arrow), is greater than a height of the elevation 18, viewed in the width direction x (arrow). Accordingly, a width of the depression 23, viewed in the height direction y (arrow), is also greater than a width of the elevation 18, viewed in the height direction y (arrow). The same applies to the depression 19 and the elevation 24.

The first insulation element 20 is preferably manufactured from an expanded plastic material, in particular from an expanded polyurethane. The first insulation element 20 preferably has an open pore structure so that the first insulation element 20 can be compressed. The plastic material has the property which, in a cured and/or cross-linked state, has preferably sticky or preferably adhesive properties. The preferably adhesive properties are provided in particular on the surfaces 21, 22 of the first insulation element 20. Here the plastic material itself has the preferably adhesive properties without the addition of an adhesive.

As a result of the first surface preferably having adhesive properties, the first insulation element 20 with the first surface 21 facing the dishwasher cavity 2 can adhere to the dishwasher cavity 2 or to the side wall 11. The connection between the side wall 11 and the first insulation element 20 is free of adhesive here. In other words, no adhesive layer is provided between the side wall 11 and the first insulation element 20. In this way the first insulation element 20 can be detached from the side wall in a non-destructive and residue-free manner.

The first insulation element 20 has a thickness d20. The thickness d20 preferably amounts to 5 to 50 mm, further preferably 10 to 45 mm, further preferably 15 to 40 mm, further preferably 20 to 35 mm, further preferably 25 to 30 mm. A density ρ20 of the first insulation element 20 preferably amounts to between 5 and 150 $kg/m^3$, particularly preferably 50 to 120 $kg/m^3$, further preferably 70 to 100 kg/m. A specific heat conductivity λ20 of the first insulation element 20 is preferably smaller than 0.1 W/(m*K), in particular smaller than 0.05 W/(m*K). The first insulation element 20 further preferably has a specific thermal capacitance c20 of less than 2,000 J/(kg*K), preferably of less than 1,600 J/(kg*K), further preferably of less than 1,400 J(kg*K).

In addition to the first insulation element 20 the insulation arrangement 15 comprises a second insulation element 25 for acoustically insulating the dishwasher cavity 2. The second insulation element 25 can also be referred to as an acoustic insulation element. The second insulation element 25 is used in particular as a mass layer and improves the acoustic properties of the insulation arrangement 15. The second insulation element 25 is likewise provided on the outside of the dishwasher cavity 2. Here the first insulation element 20 is positioned between the dishwasher cavity 2 and the second insulation element 25. The second insulation element 25 comprises a first surface 26 facing the first insulation element 20 and a second surface 27 facing away from the first surface 26. The second insulation element 25 can preferably be separated from the first insulation element 20 in a non-destructive manner. Alternatively, the insulation elements 20, 25 can also be non-detachably connected to one another.

The second insulation element 25 has a thickness d25. The thickness d25 is smaller than the thickness d20 of the first insulation element 20. By way of example, the thickness d25 can amount to 1 to 10 mm, preferably 1 to 8 mm, further preferably 1 to 5 mm, further preferably 1 to 3 mm. In particular, the first insulation element 20 prevents a heat transfer from the dishwasher cavity 2 to the second insulation element 25. In this regard the second insulation element 25 cannot take heat from the dishwasher cavity 2. As a result the energy efficiency of the household dishwasher 1 is improved. Vibrations of the dishwasher cavity 2 are converted into heat in the second insulation element 25. The first insulation element 20 can also convert vibrations into heat.

The first insulation element 20 is, as already mentioned, suited to damping vibrations. A loss factor of the plastic material of the first insulation element 20 is high and matched to the use in the household dishwasher 1. A "loss factor" is understood here in the physical vibrations of a different type to mean the ratio of the loss-afflicted imaginary part in relation to the loss-free real part of a complex variable. The loss factor of the plastic material of the first insulation element 20 is in particular greater than 0.2, preferably greater than 0.4 at 20° C. Furthermore, the hysteresis loss according to the IFD method ("Hysteresis Loss—IFD") according to ASTM D3574 is preferably greater than 15%, preferably greater than 20%, in particular greater than 30% and the recovery time according to ASTM D3574 is preferably greater than 2 s, preferably greater than 4, in particular greater than 5 s. The vibrations are partially also routed to the second insulation element 25. The second insulation element 25, in association with the insulation arrangement 15, substantially makes available a surface mass as a result of its high density.

The second insulation element 25 preferably has a significantly higher density than the first insulation element 20. The second insulation element 25 is preferably manufactured from a bitumen material, in particular from a metal and/or stone-filled bitumen material, or from a plastic material, in particular from a metal and/or stone-filled plastic material. For instance, the second insulation element 25 can be manufactured from a butyl material. The second insulation element 25 is in particular plate or mat-shaped. The second insulation element 25 can also be a metal sheet, in particular a steel sheet.

The second insulation element 25 is used to sound deaden the dishwasher cavity 2 or to dampen vibrations of the dishwasher cavity 2. The second insulation element preferably has as a high a loss factor as possible. The loss factor of the material of the second insulation element 25 at 20° C. is preferably greater than 0.08, further preferably greater than 0.15. A density ρ25 of the second insulation element 25 is preferably greater than 1,000 kg/m$^3$.

The insulation arrangement 15 can also comprise an optional separation layer 28. The separation layer 28 is positioned between the first insulation element 20 and the second insulation element 25, in particular between the surfaces 22, 26. The separation layer 28 can be a layer of wax, a film, for instance a polyethylene film or suchlike. The separation layer 28 can also comprise a number of films. The separation layer 28 enables a separation of the second insulation element 25 from the first insulation element 20 in a non-destructive and residue-free manner.

The household dishwasher 1 further comprises a fastening facility 29 for mechanically fastening the insulation arrangement 15 to the dishwasher cavity 2. "Mechanical fastening" is to be understood here to mean that the fastening facility 29 fixes the insulation arrangement 15 to the dishwasher cavity 2 in a form-fit and/or frictional manner. To this end the fastening facility 29 can be connected with the dishwasher cavity 2 in a form-fit manner. For instance, the fastening facility 29 can be screwed or clamped to the dishwasher cavity 2. A material-bonded connection between the fastening facility 29 and the dishwasher cavity 2 is not provided.

The fastening facility 29 can be an outer cladding provided on the outside of the dishwasher cavity 2, for instance. The fastening facility 29 is arranged on the outside of the insulation arrangement 15, in particular on the outside of the second insulation element 25. The fastening facility 29 can be a steel sheet, for instance. The fastening facility 29 can be part of a housing of the household dishwasher 1.

The fastening facility 29 can comprise a first surface 30 facing the second insulation element 25 and a second surface 31 facing away from the second insulation element 25. The fastening facility 29 either rests loosely on the second insulation element 25 or is connected herewith so that the fastening facility 29 can be detached from the second insulation element 25 in a non-destructive and residue-free manner. A non-detachable connection can also be provided between the second insulation element 25 and the fastening facility 29. In this case, the second insulation element 25 can be manufactured from a self-adhesive bitumen. In particular, a non-detachable connection of this type to the door 3 is advantageous. Furthermore, a separation layer 32 can be provided between the second insulation layer 25 and the fastening facility 29. The separation layer 32 is optional. The separation layer 32 can be structured identically to the separation layer 28.

The fastening facility 29 can be used to achieve a connection between the insulation arrangement 15 and the dishwasher cavity 2, which lasts for the entire service life of the household dishwasher 1, in addition to the connection between the plastic material of the first insulation element 20 and the dishwasher cavity 2 and in addition to the form-fit connection between the first insulation element 20 and the dishwasher cavity 2. The fastening facility 29 can be provided here on the rear wall 9, the side walls 10, 11, the ceiling 8, the base 7 and also on the door 3. With the aid of the fastening facility 29, the individual components of the insulation arrangement 15 can be kept in position on the dishwasher cavity 2.

Figure 2B:
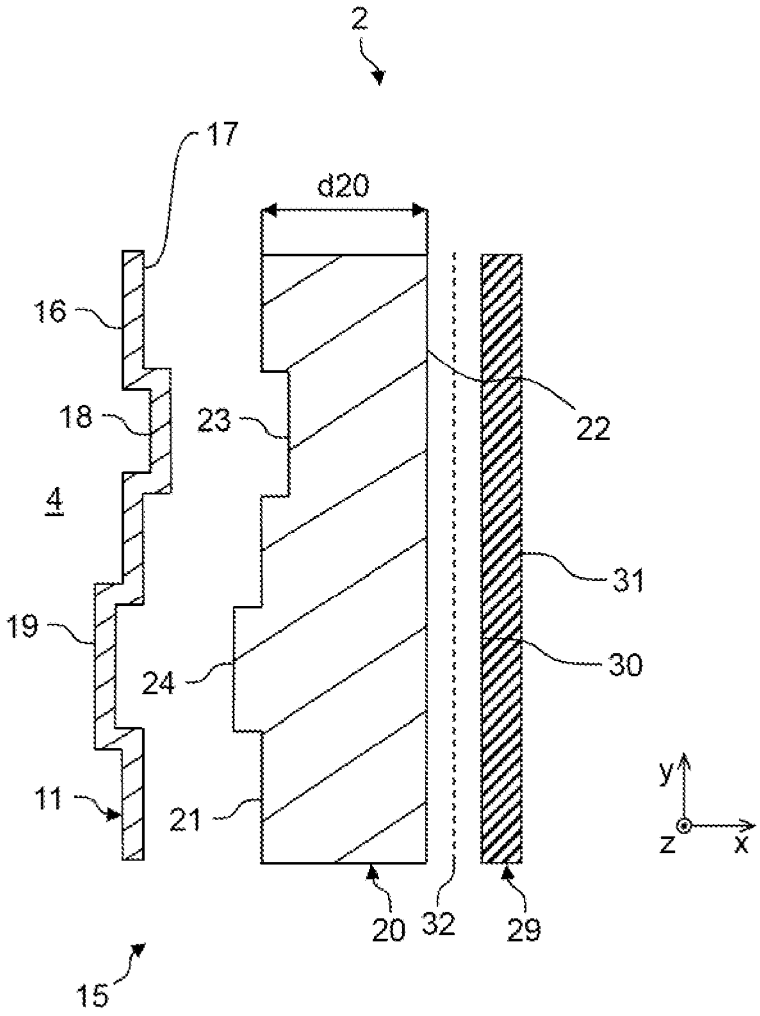
FIG. 2B shows a schematic partial sectional view of a further embodiment of a dishwasher cavity for the household dishwasher according to FIG. 1 in an exploded representation.
Figure 3B:
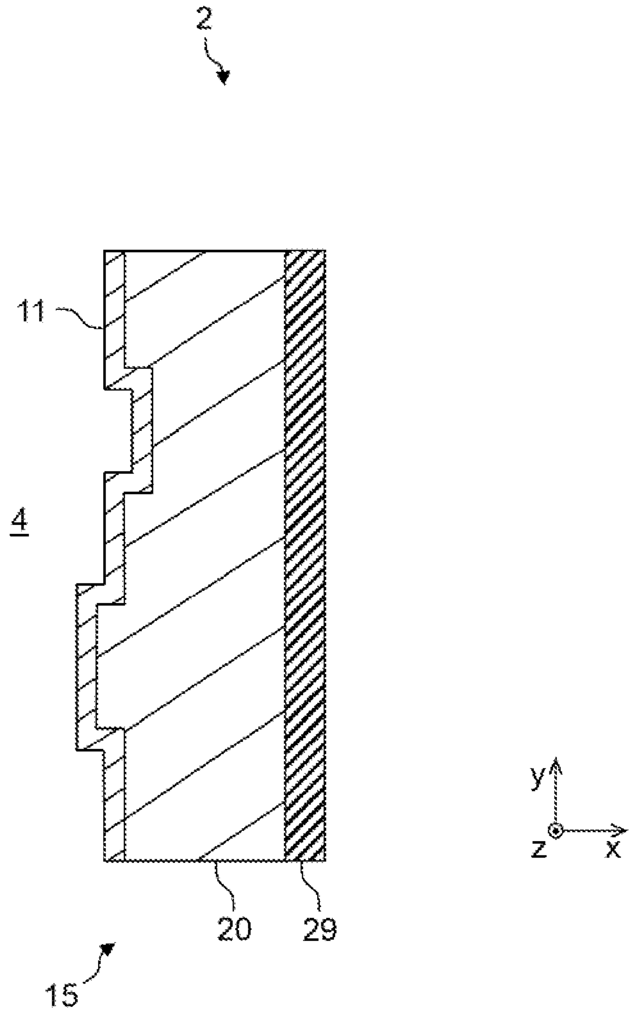
FIG. 3B shows a further schematic partial sectional view of the dishwasher cavity according to FIG. 2B.

FIG. 2B shows a schematic partial sectional view of a further embodiment of the dishwasher cavity 2 in an exploded representation. FIG. 3B shows a further partial sectional view of the dishwasher cavity 2. The dishwasher cavity 2 according to FIGS. 2B and 3B differs from the dishwasher cavity 2 according to FIGS. 2A and 3A only in that the insulation arrangement 15 only has the first insulation element 20. The second insulation element 25 is in particular not provided.

Figure 4:
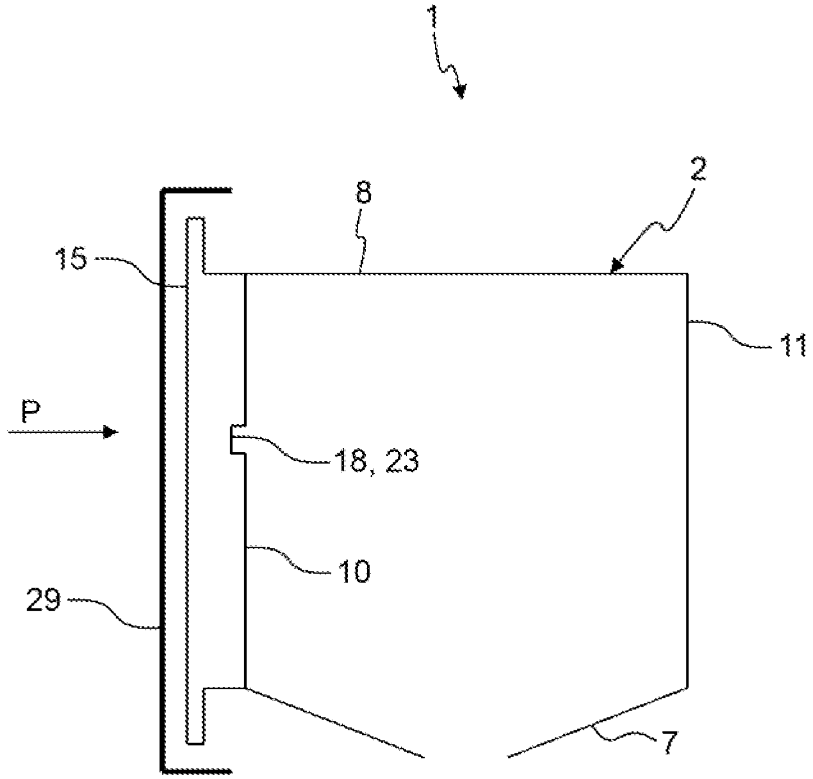
FIG. 4 shows a schematic sectional view of a further embodiment of a household dishwasher.

FIG. 4 shows a schematic sectional view of a further embodiment of a household dishwasher 1. As shown in FIG. 4, the fastening facility 29 can be embodied as an outer cladding attached to the side wall 10. For instance, the fastening facility 29 can be connected to the ceiling 8 and the base 7, and the insulation arrangement 15 adhering to the side wall 11 can press against the side wall 10 with a defined contact pressure P. To this end, the fastening facility 29 can be spring pretensioned.

Figure 5:
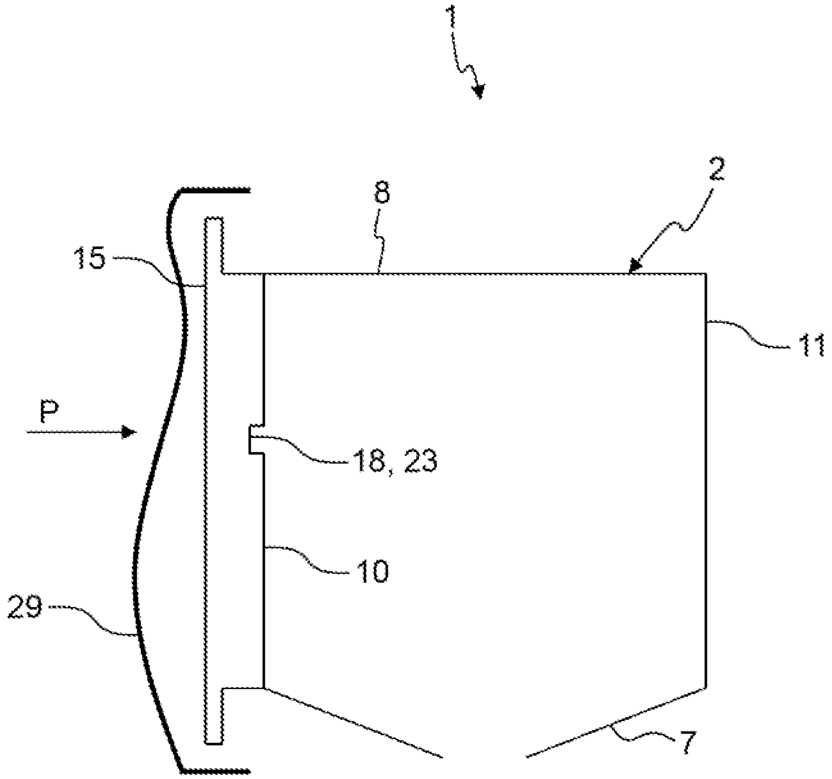
FIG. 5 shows a schematic sectional view of a further embodiment of a household dishwasher.

FIG. 5 shows a schematic sectional view of a further embodiment of a household dishwasher 1. In this embodiment of the household dishwasher 1, the fastening facility 29 is embodied so that this does not rest in a planar manner on the insulation arrangement 15, but instead only in the manner of points and/or lines. The fastening facility 29 can therefore have any geometry.

Figure 6:
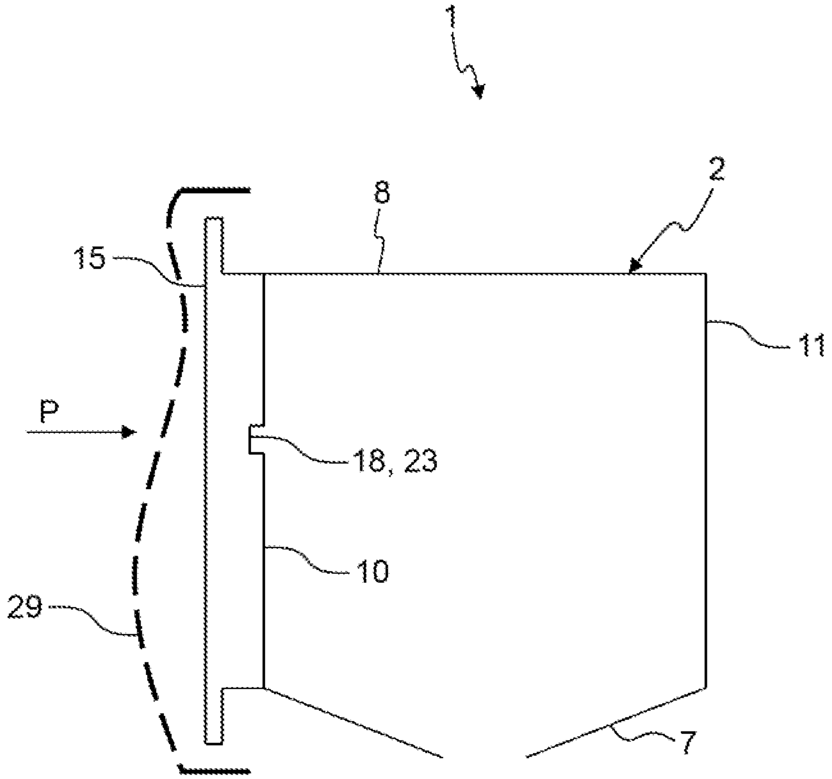
FIG. 6 shows a schematic sectional view of a further embodiment of a household dishwasher.

FIG. 6 shows a schematic sectional view of a further embodiment of a household dishwasher 1. With this embodiment of the household dishwasher 1, the fastening facility 29 is embodied as a grid or mesh. In particular, the fastening facility 29 can be a plastic grid or a plastic mesh or a metal grid or a metal mesh. The fastening facility 29 can in turn be connected to the ceiling 8 and the base 7 in order to press the insulation arrangement 15 against the side wall 10 with the contact pressure P.

Figure 7:
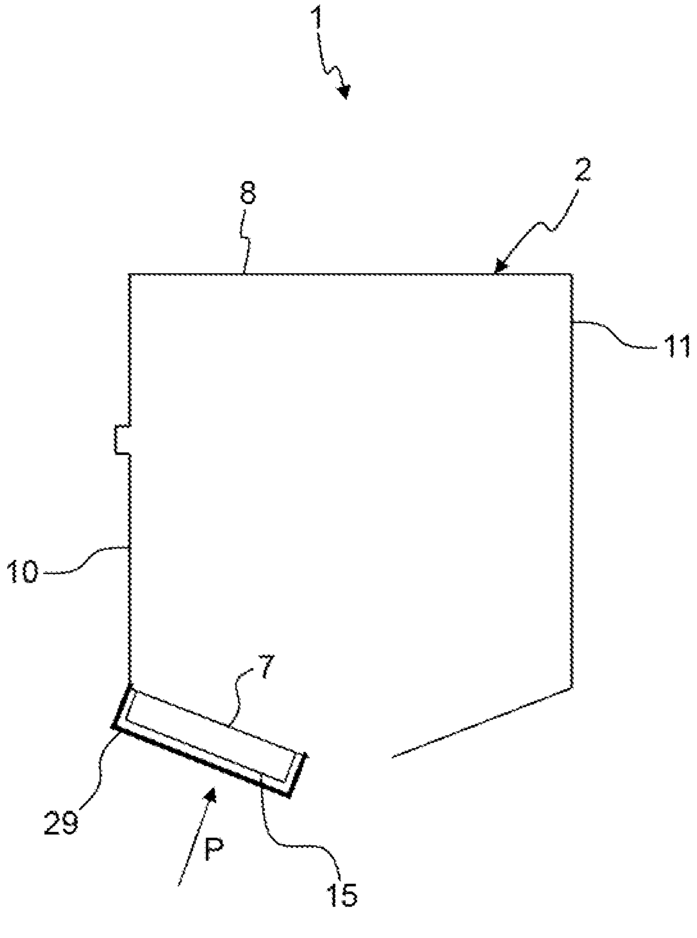
FIG. 7 shows a schematic sectional view of a further embodiment of a household dishwasher.

FIG. 7 shows a schematic sectional view of a further embodiment of a household dishwasher 1. In this embodiment of the household dishwasher 1, the insulation arrangement 15 is arranged on the base 7 and fastened to the base 7 with the aid of a fastening facility 29, as explained previously.

Compared with an exclusive fastening of the insulation arrangement 15 with the aid of the preferably adhesive properties of the first insulation element 20, the contact pressure P can be fixed by the geometric configuration of the fastening facility 29 and adjusted to the material selection. With the aid of the fastening facility 29, the bond between the insulation arrangement 15 and the dishwasher cavity 2 can be ensured throughout the entire service life of the household dishwasher 1. The use of meshes or grids made from plastics or metals for the fastening facility 29 enables a large-area fixing of the insulation arrangement 15 with low material outlay. The thermal and/or acoustic function of the insulation arrangement 15 is ensured across the entire service life of the household dishwasher 1 by means of a constant contact pressure P.

Figure 8:
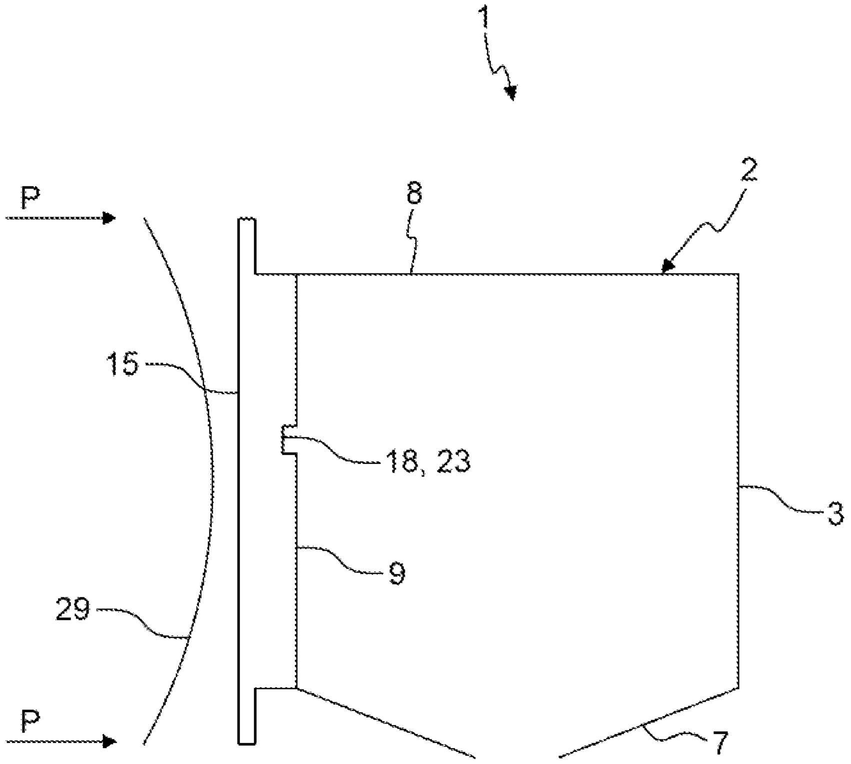
FIG. 8 shows a schematic sectional view of a further embodiment of a household dishwasher.

FIG. 8 shows a schematic sectional view of a further embodiment of a household dishwasher 1. The household dishwasher 1 is cut here parallel to the side walls 10, 11, so that the door 3 and the rear wall 9 are visible in sections in FIG. 8. With the rear wall 9, an additional mechanical fastening is in particular advantageous. This can be integrated into the outer lying second insulation element 25. The fastening facility 29 is curved in an arc so that the insulation arrangement 15 can be pressed against the rear wall 9 with a spring pretensioning.

Figure 9:
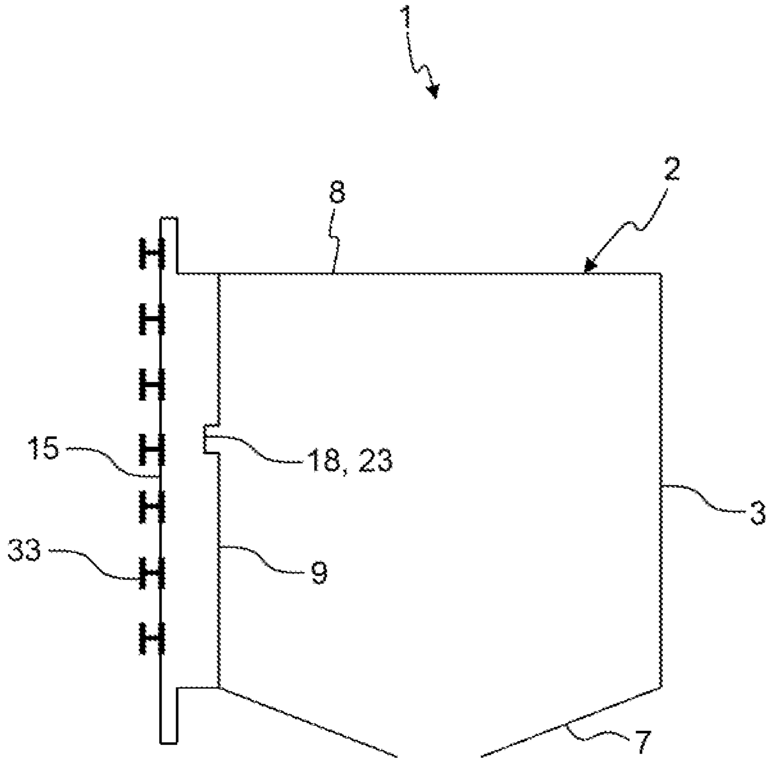
FIG. 9 shows a schematic sectional view of a further embodiment of a household dishwasher.

As FIG. 9 shows, a reinforcement 33 in the form of ribs or a beading can additionally be provided. Alternatively, this reinforcement 33 can be an additional outer lying component. Furthermore, the second insulation element 25 can be formed in such a way that it offers a stability which is sufficient in terms of geometry and/or material properties, in order to be pressed against the rear wall 9 of the dishwasher cavity 2 across the entire width.

Figure 10:
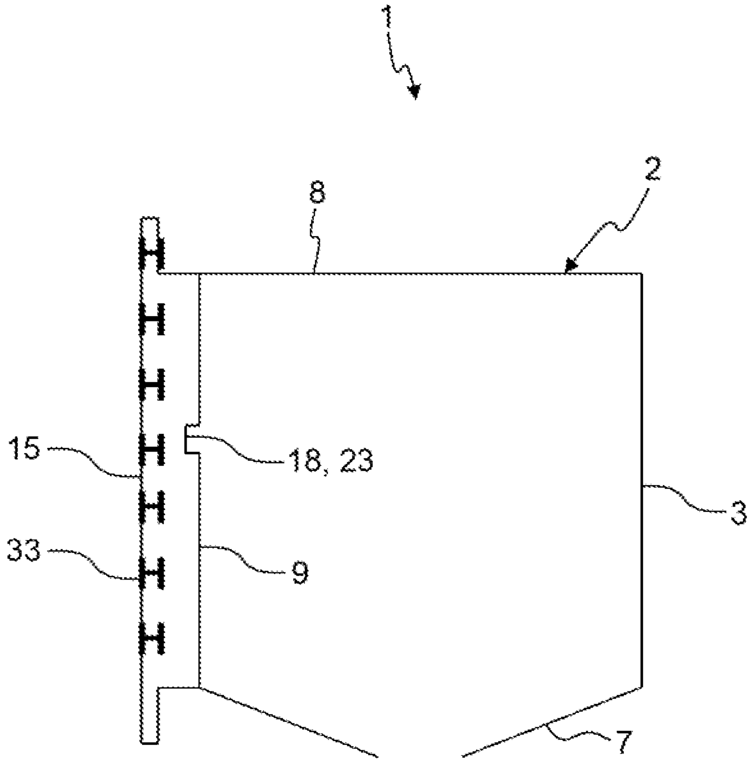
FIG. 10 shows a schematic sectional view of a further embodiment of a household dishwasher.

Furthermore, the depression 33, as shown in FIG. 10, can be molded inwards in the second insulation element 25, in the direction of the dishwasher cavity 2.

On account of such a form of the reinforcement 33, the fastening facility 29 can be fastened to the rear wall 9 of the dishwasher cavity 2 if a clip or fastening is only provided on the edge of the insulation arrangement 15. The reinforcement 33 acts in a supporting manner across the width of the insulation arrangement 15 and transfers the retaining forces into the insulation arrangement 15. In this way an increase in the bending stiffness of the insulation arrangement 15 can be achieved for the rear wall 9. The insulation arrangement 15 can be pretensioned inwards in the direction of the dishwasher cavity 2, and a fixing is only required on the edge and results in a secure, permanent and full-area fixing of the insulation arrangement 15 to the rear wall 9.

As a result of the reinforcement 33, an acoustically favorable connection of the rear wall 9 to the first insulation element 20 is produced. A permanent and secure connection of the insulation arrangement 15 to the rear wall 9 is achieved. A space-saving arrangement in the form of the reinforcement 33 is produced in the direction of the dishwasher cavity 2. Furthermore, a particularly cost-effective embodiment is produced in a reinforced manner in the molding of the outer lying second insulation element 25 with the aid of beads or ribs.

Although the present invention has been described on the basis of exemplary embodiments, it can be modified in a variety of ways.

REFERENCE CHARACTERS USED

1 household appliance; household dishwasher
2 functional container, dishwasher cavity
3 door
4 washing compartment
5 pivot axis
6 loading opening
7 base
8 ceiling
9 rear wall
10 side wall
11 side wall
12 receptacle for items to be washed
13 receptacle for items to be washed
14 receptacle for items to be washed
15 insulation arrangement
16 interior
17 exterior
18 elevation
19 depression
20 first insulation element
21 surface
22 surface
23 depression
24 elevation
25 second insulation element
26 surface
27 surface
28 separation layer
29 fastening facility
30 surface
31 surface
32 separation layer
reinforcement
A extraction direction (arrow)
d20 thickness
d25 thickness
E insertion direction (arrow)
P contact pressure
x width direction (arrow)
y height direction (arrow)
z depth direction (arrow)
$\lambda$20 thermal conductivity
$\rho$20 density
92 25 density

The invention claimed is:

1. A household appliance, comprising:

a functional container;

an insulation arrangement provided on an outside of the functional container and configured to thermally or acoustically insulate the functional container, said insulation arrangement including a first insulation element consisting of a single plastic material that has an adhesive property and that exhibits a specific heat conductivity of lower than 0.1 W/(mK), the single plastic material being selected such that a surface of the first insulation element in facing relation to the functional container directly adheres to the functional container and is separable herefrom in a non-destructive manner, wherein the single plastic material is configured to be formed by mixing a plurality of chemical components; and a fastening facility configured to press the insulation arrangement against the functional container to maintain a contact pressure of the insulation arrangement against the functional container throughout a service life of the household appliance.

2. The household appliance of claim 1, wherein the household appliance is constructed in a form of a household dishwasher.

3. The household appliance of claim 1, wherein the functional container is a dishwasher cavity.

4. The household appliance of claim 1, wherein the single plastic material has the adhesive property in a cured and/or cross-linked state.

5. The household appliance of claim 1, wherein the single plastic material is polyurethane.

6. The household appliance of claim 1, wherein the single plastic material is an expanded polyurethane.

7. The household appliance of claim 1, wherein the single plastic material has a viscoelastic property.

8. The household appliance of claim 1, wherein the fastening facility is connected to the functional container.

9. The household appliance of claim 1, wherein the insulation arrangement includes a second insulation element, said first insulation element being arranged between the functional container and the second insulation element.

10. The household appliance of claim 9, wherein the fastening facility is configured as an external cladding on the outside of the functional container, said second insulation element being arranged between the fastening facility and the first insulation element.

11. The household appliance of claim 9, wherein the fastening facility is configured as a grid or mesh on the outside of the functional container, said second insulation element being arranged between the fastening facility and the first insulation element.

12. The household appliance of claim 9, wherein the second insulation element has a reinforcement.

13. The household appliance of claim 12, wherein the reinforcement is configured in a form of ribs or beads.

14. The household appliance of claim 12, wherein the reinforcement is configured to project away from the functional container out of the second insulation element.

15. The household appliance of claim 12, wherein the reinforcement is configured to project toward the functional container into the second insulation element.

16. The household appliance of claim 1, wherein the first insulation element is configured to exhibit a specific heat conductivity of lower than 0.05 W/(mK).

17. The household appliance of claim 1, wherein the first insulation element is configured to exhibit a specific thermal capacitance of lower than 2,000 J/(kgK).

18. The household appliance of claim 1, wherein the first insulation element is configured to exhibit a loss factor of greater than 0.2, and wherein the loss factor represents a ratio of a loss-afflicted imaginary part of a complex variable in relation to a loss-free real part of the complex variable.

19. The household appliance of claim 1, wherein the adhesive property of the single plastic material is further based on physical-mechanical forces.

* * * * *